(12) United States Patent
Ishida et al.

(10) Patent No.: US 9,188,728 B2
(45) Date of Patent: Nov. 17, 2015

(54) ILLUMINATING DEVICE AND DISPLAY DEVICE

(75) Inventors: Takeshi Ishida, Osaka (JP); Ryuzo Yuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 99 days.

(21) Appl. No.: 14/126,861

(22) PCT Filed: Jun. 11, 2012

(86) PCT No.: PCT/JP2012/064879
§ 371 (c)(1),
(2), (4) Date: Dec. 17, 2013

(87) PCT Pub. No.: WO2013/002015
PCT Pub. Date: Jan. 3, 2013

(65) Prior Publication Data
US 2014/0119048 A1    May 1, 2014

(30) Foreign Application Priority Data
Jun. 28, 2011  (JP) ................................. 2011-143098

(51) Int. Cl.
*F21V 8/00*    (2006.01)
(52) U.S. Cl.
CPC ............ *G02B 6/0036* (2013.01); *G02B 6/0038* (2013.01); *G02B 6/0053* (2013.01)
(58) Field of Classification Search
CPC ........ G02B 6/00; G02B 6/0028; G02B 6/003; G02B 6/0036; G02B 6/0038; G02B 6/04; G02B 6/0073

USPC ........................................ 362/613, 97.1–97.4
See application file for complete search history.

(56) References Cited

U.S. PATENT DOCUMENTS

| | | | | |
|---|---|---|---|---|
| 6,827,458 B2* | 12/2004 | Suga | ............................. | 362/609 |
| 7,591,580 B2* | 9/2009 | Maeda et al. | .................. | 362/625 |
| 7,663,713 B2* | 2/2010 | Saito et al. | ....................... | 349/65 |
| 2009/0122229 A1 | 5/2009 | Kim et al. | | |

(Continued)

FOREIGN PATENT DOCUMENTS

| JP | 2009-122637 A | 6/2009 |
|---|---|---|
| JP | 2009-129792 A | 6/2009 |

(Continued)

OTHER PUBLICATIONS

Official Communication issued in International Patent Application No. PCT/JP2012/064879, mailed on Aug. 7, 2012.

*Primary Examiner* — Anabel Ton
(74) *Attorney, Agent, or Firm* — Keating & Bennett, LLP

(57) ABSTRACT

An illuminating device 20 includes a plurality of light sources 21 and a light guide plate 30 guiding light incident on an incident surface 30a that opposes the light sources 21 and emitting illuminating light from an emission surface 30b. The light guide plate 30 includes a plurality of prisms 32 that extend in an optical axis direction Y and are arranged next to each other in a longitudinal direction X, the prisms 32 scattering the guided light in the longitudinal direction X. At least a top portion 32a of each prism 32 includes a curved portion 32c having a curved shape in cross section. A bottom portion 32b of each prism 32, the bottom portion 32b extending upward from a surface of the light guide plate 30, has a radius of curvature greater than that of the top portion 32a.

4 Claims, 9 Drawing Sheets

(56) References Cited

U.S. PATENT DOCUMENTS

2011/0299013 A1  12/2011  Ishida et al.
2012/0113158 A1   5/2012  Goto et al.

FOREIGN PATENT DOCUMENTS

JP    2012-084505 A    4/2012
WO   2010/100784 A1   9/2010

* cited by examiner

ILLUMINATING DEVICE AND DISPLAY DEVICE

TECHNICAL FIELD

The present invention relates to an illuminating device including a light guide plate and a display device including the illuminating device.

BACKGROUND ART

PTL 1 discloses a known illuminating device used as, for example, a backlight of a liquid-crystal display device. The illuminating device includes a plurality of light sources and a light guide plate which guides light emitted from the light sources and emits illuminating light. The light sources include LEDs, and are arranged next to each other in one direction.

The light guide plate is a molded part made of a resin that has a substantially rectangular shape in plan view, and has an incident surface that opposes the light sources on a side surface and an emission surface from which the illuminating light is emitted on a front surface. A plurality of inclined surfaces that extend in a longitudinal direction of the incident surface and that oppose the incident surface in an inclined manner are arranged next to each other in an optical axis direction of the light sources on a rear surface of the light guide plate.

A plurality of prisms that extend in the optical axis direction of the light sources are arranged next to each other in the longitudinal direction of the incident surface on the emission surface on the front surface of the light guide plate. The prisms are arranged at a predetermined pitch in the longitudinal direction of the incident surface, and flat portions, which are flat surfaces, are provided between the prisms. The prisms have an arc-shaped cross section along a plane parallel to the longitudinal direction of the incident surface.

The light emitted from the light sources enters the light guide plate through the incident surface. The light that has entered the light guide plate is guided in the optical axis direction of the light sources by being reflected by the emission surface and the rear surface of the light guide plate. The light that has been guided by the light guide plate and reached the prisms is reflected while being scattered in the longitudinal direction of the incident surface. The light guided by the light guide plate is reflected by the inclined surfaces on the rear surface such that the incident angle of the light on the emission surface is reduced. The reflection is repeated, and light incident on the emission surface at an incident angle smaller than the critical angle is emitted. Thus, illuminating light is emitted from the emission surface while being scattered in the optical axis direction and the longitudinal direction of the incident surface.

CITATION LIST

Patent Literature

PTL 1: Japanese Unexamined Patent Application Publication No. 2009-129792 (pages 7 to 13 and FIG. 4)

SUMMARY OF INVENTION

Technical Problem

The prisms on the light guide plate are formed so that an inclination angle of bottom portions of the prisms that extend upward from the flat portions with respect to the flat portions is optimized in accordance with the arrangement of the light sources and the shape of the light guide plate. As the inclination angle is reduced, the effect of scattering the guided light is reduced. Accordingly, linear high-brightness regions are formed in the illuminating light in areas between the adjacent light sources. As the inclination angle is increased, the effect of scattering the guided light is increased, but the effect of collecting the emitted light is also increased. Accordingly, point-shaped high-brightness regions are formed in the illuminating light.

However, according to the above-described known illuminating device, there are differences between the heights of the prisms from the flat portions depending on the processing accuracy in the process of forming a mold of the light guide plate. Since the prisms have an arc-shaped cross section, when the prisms have different heights, the bottom portions thereof have different inclination angles with respect to the flat portions. Therefore, there has been a problem that the brightness of the illuminating light cannot be made uniform owing to the differences in height between the prisms.

Also in the case where the pitch of the prisms is equal to the width of the prisms and the flat portions cannot be formed, the bottom portions of the prisms have different inclination angles when there are differences in height and pitch between the prisms. Similarly, also when the prisms having a recessed shape are formed in the emission surface, there has been a problem that the brightness of the illuminating light cannot be made uniform owing to the differences in depth between the prisms.

An object of the present invention is to provide an illuminating device with which the brightness of the illuminating light can be made uniform and a display device including the illuminating device.

Solution to Problem

To achieve the above-described object, according to the present invention, an illuminating device includes a plurality of light sources arranged next to each other in one direction and a light guide plate having an incident surface that opposes the light sources on a side surface thereof, the light guide plate guiding light incident on the incident surface and emitting illuminating light from an emission surface provided on a front surface thereof. The light guide plate includes a plurality of prisms that extend in an optical axis direction of the light sources and are arranged next to each other in a longitudinal direction of the incident surface, the prisms scattering the guided light in the longitudinal direction. At least a top portion of each prism includes a curved portion having a curved shape in cross section. A bottom portion of each prism, the bottom portion extending upward from a surface of the light guide plate, has a radius of curvature greater than that of the top portion.

With this structure, the light emitted from the light sources enters the light guide plate through the incident surface. The light that has entered the light guide plate is guided by being reflected by the emission surface and a surface opposing the emission surface of the light guide plate. The light that has been guided by the light guide plate and reached the prisms is reflected while being scattered in the longitudinal direction of the incident surface. Light incident on the emission surface at an incident angle smaller than the critical angle by being repeatedly reflected in the light guide plate is emitted from the emission surface. The prisms may either be provided on the emission surface or a surface opposing the emission surface of the light guide plate. The prisms may either be formed so as to project from the light guide plate or be recessed in the light guide plate.

According to the present invention, in the illuminating device having the above-described structure, the bottom portion of each prism may include a flat surface.

According to the present invention, in the illuminating device having the above-described structure, each prism may have the shape of an elliptical arc having a major axis orthogonal to the longitudinal direction in cross section.

According to the present invention, in the illuminating device having the above-described structure, the elliptical arc has an aspect ratio of 1.25 or more.

According to the present invention, in the illuminating device having the above-described structure, the prisms may be formed on the emission surface, and first inclined surfaces that oppose the incident surface in an inclined manner and that are arranged next to each other in the optical axis direction may be provided between the prisms.

With this structure, the prisms and the first inclined surfaces are arranged next to each other in the longitudinal direction of the incident surface on the emission surface of the light guide plate. The angle of the direction in which the light guided by the light guide plate travels with respect to the optical axis direction increases when the light is reflected by the first inclined surfaces. The reflection is repeated, and light incident on the emission surface at an incident angle smaller than the critical angle is emitted.

According to the present invention, in the illuminating device having the above-described structure, the light guide plate may include a light guide portion having the incident surface and the emission surface, a low-refractive-index layer that is adjacent to a rear surface of the light guide portion and has a refractive index lower than that of the light guide portion, and a light collecting portion including second inclined surfaces that are arranged next to each other in the optical axis direction, the second inclined surfaces being formed on a surface of the light collecting portion that is opposite the emission surface across the low-refractive-index layer and opposing the incident surface in an inclined manner.

With this structure, light incident on the light guide portion of the light guide plate is reflected by the emission surface on a front surface of the light guide portion and a rear surface of the light guide portion. Light incident on the rear surface of the light guide portion at an incident angle smaller than the critical angle enters the low-refractive-index layer. Light that has entered the low-refractive-index layer and is incident on the second inclined surfaces at an incident angle greater than the critical angle is reflected toward the emission surface, transmitted through the light guide portion, and is emitted from the emission surface. Light incident on the second inclined surfaces at an incident angle smaller than the critical angle is emitted from the light collecting portion while being refracted by the second inclined surfaces, and reenters the light collecting portion. When the incident angle on the second inclined surfaces becomes greater than the critical angle, the light is emitted toward the emission surface.

A display device according to the present invention includes the illuminating device having any of the above-described structures and a display panel arranged so as to oppose the emission surface of the light guide plate.

Advantageous Effects of Invention

According to the present invention, at least the top portion of each of the prisms that scatter the guided light in the longitudinal direction of the incident surface includes a curved portion having a curved shape in cross section, and the radius of curvature of the bottom portion that extends upward from a surface of the light guide plate is greater than that of the top portion. Therefore, even when there are differences in height or depth between the prisms depending on the processing accuracy in the process of forming a mold of the light guide plate, differences in the inclination angle between the bottom portions of the prisms can be reduced. As a result, the brightness of the illuminating light can be made more uniform.

DESCRIPTION OF EMBODIMENTS

Figure 1:
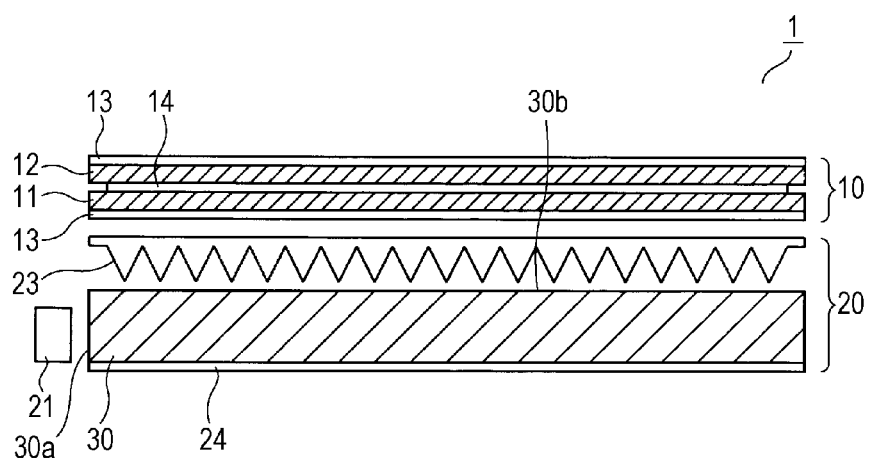
FIG. 1 is a side sectional view of a display device according to a first embodiment of the present invention.

Embodiments of the present invention will now be described with reference to the drawings. FIG. 1 is a side sectional view of a display device according to a first embodiment. The display device 1 includes a display panel 10 and a backlight 20 (illuminating device). The display panel 10 is a liquid-crystal display panel in which liquid crystal 14 is injected into a space between an active matrix substrate 11 including switching elements, such as TFTs, and a counter substrate 12 that opposes the active matrix substrate 11.

Polarizing films 13 are arranged on a light receiving surface of the active matrix substrate 11 and an emission surface of the counter substrate 12.

Figure 2:
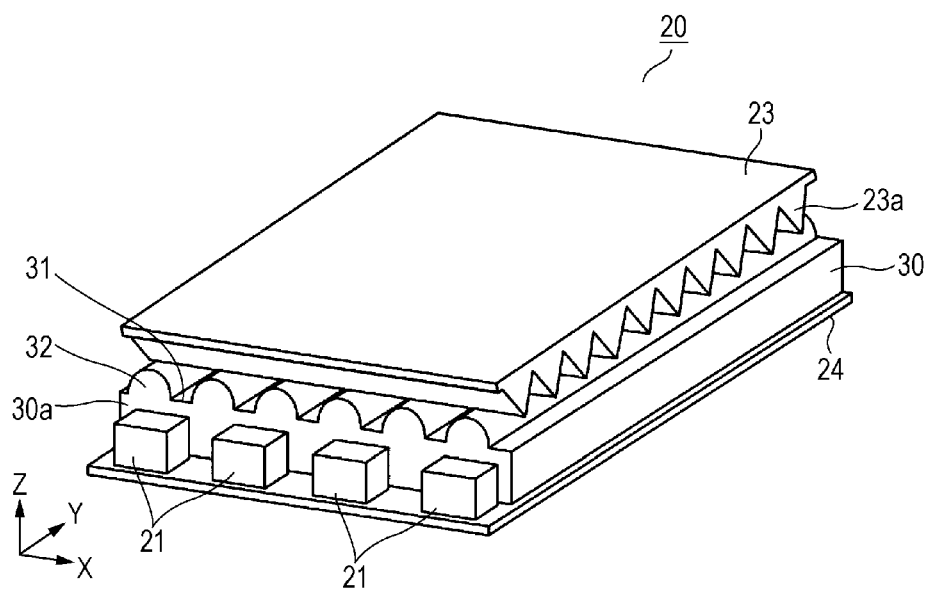
FIG. 2 is a perspective view of a backlight included in the display device according to the first embodiment of the present invention.

FIG. 2 is a perspective view of the backlight 20. The backlight 20 includes light sources 21, a light guide plate 30, a prism sheet 23, and a reflective sheet 24. The light sources 21 include LEDs, and are arranged next to each other in one direction (X direction).

The light guide plate 30 is made of, for example, a transparent resin, such as an acrylic resin or polycarbonate, and has a rectangular shape in plan view. A side surface of the light guide plate 30 serves as an incident surface 30a which opposes the light sources 21 and on which light emitted from the light sources 21 is incident. A front surface of the light guide plate 30 that opposes the display panel 10 serves as an emission surface 30b (see FIG. 1) from which the illuminating light is emitted.

In the following description, the longitudinal direction of the incident surface 30a is defined as the X direction, an optical axis direction of the light sources 21 that is orthogonal to the X direction is defined as the Y direction, and the direction in which light is emitted from the light guide plate 30 and which is orthogonal to the X and Y directions is defined as the Z direction.

The prism sheet 23 is arranged so as to oppose the emission surface 30b of the light guide plate 30. A plurality of prisms 23a that extend in the X direction are arranged next to each other in the Y direction on a bottom surface (light-guide-plate-30 side surface) of the prism sheet 23. The prisms 23a substantially have the shape of an isosceles triangle in cross section, and reduce the directional angle of the light emitted from the emission surface 30b in a direction orthogonal to the ridges (Y direction). Accordingly, the brightness on the front surface of the emission surface 30b can be increased.

The reflective sheet 24 reflects light emitted from a rear surface of the light guide plate 30 and returns the light to the light guide plate 30, thereby increasing the utilization efficiency of light.

Figure 3:
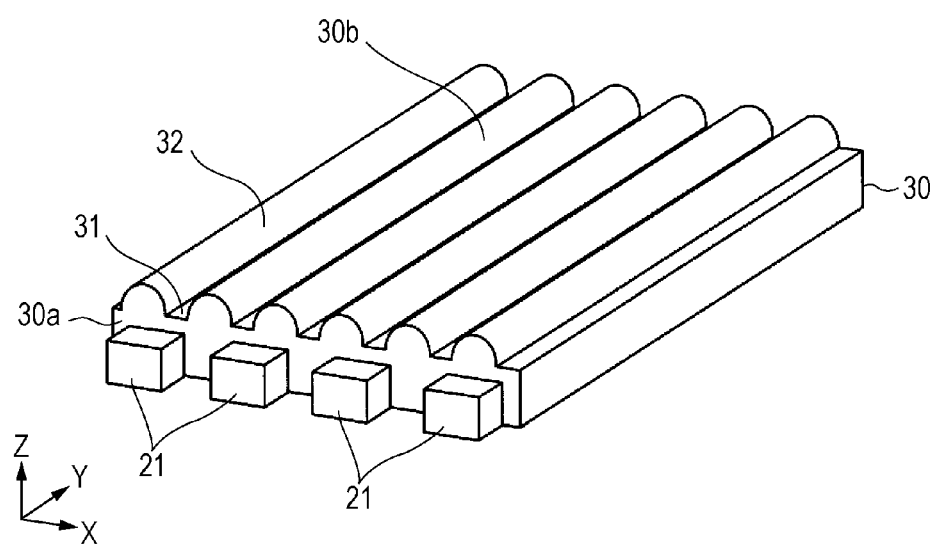
FIG. 3 is a perspective view of a light guide plate of the backlight included in the display device according to the first embodiment of the present invention.

FIG. 3 is a perspective view of the light guide plate 30. Flat portions 31, which are flat surfaces parallel to the X-Y plane, and prisms 32, which project from the flat portions 31, are alternately arranged in the X-direction on the emission surface 30b of the light guide plate 30. Thus, the prisms 32 are arranged next to each other in the X direction, and have the shape of a barrel roof that extends in the Y direction. The flat portions 31 are flat in the X direction.

Figure 4:
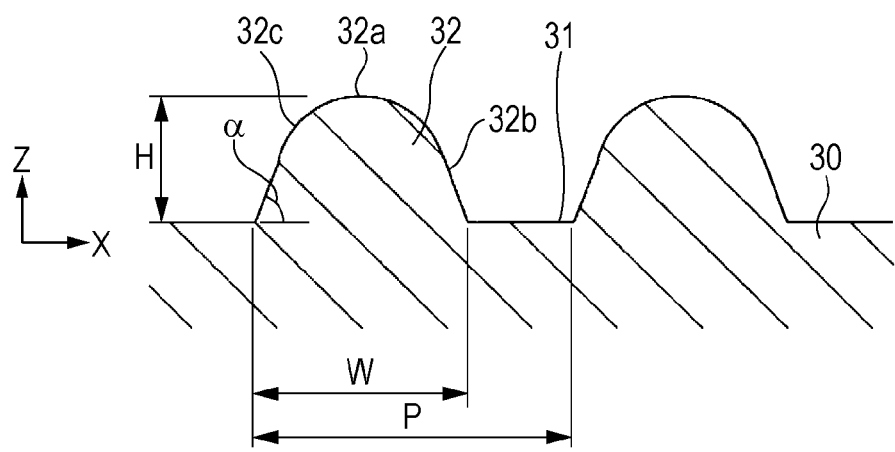
FIG. 4 is a sectional view of the light guide plate of the backlight included in the display device according to the first embodiment of the present invention taken along a plane parallel to an incident surface.

FIG. 4 is a sectional view of the light guide plate 30 taken along a plane parallel to the incident surface 30a. The prisms 32 are formed such that a height H thereof from the flat portions 31 in the Z direction and a width W thereof in the X direction are set to predetermined values, and are arranged next to each other in the X direction at a pitch P. For example, the height H is about 10 μm, the width W is about 25 μm, and the pitch P is about 40 μm. The width W is preferably 50% or more of the pitch P.

Bottom portions 32b of each prism 32 that extend upward from the flat surfaces 31 are inclined flat surfaces. An upper portion of each prism 32 includes a curved portion 32c that continues from the bottom portions 32b and has an arc shape in cross section. The cross sectional shape of the curved portion 32c is not limited to an arc shape, and may instead be other curved shapes, such as an elliptical arc shape. Thus, a top portion 32a of each prism 32 includes the curved portion 32c having a curved surface. The radius of curvature of the bottom portions 32b is infinite, and is therefore greater than that of the top portion 32a.

Since the light guide plate 30 is a molded part made of a resin, there are differences in height H between the prisms 32 depending on the processing accuracy in the process of forming a mold. Since the bottom portions 32b of the prisms 32 are flat surfaces, the inclination angle α (for example, 70°) of the bottom portions 32b with respect to the flat portions 31 can be made uniform irrespective of the differences in height H.

In the display device 1 having the above-described structure, the light emitted from the light sources 21 enters the light guide plate 30 through the incident surface 30a. The light that has entered the light guide plate 30 is guided by being reflected by the emission surface 30b and the rear surface of the light guide plate 30. The light that has been guided by the light guide plate 30 and reached the prisms 32 is reflected while being scattered in the longitudinal direction of the incident surface 30a (X direction). The light guided by the light guide plate 30 is repeatedly reflected, and light incident on the emission surface 30b at an incident angle smaller than the critical angle is emitted. Thus, the illuminating light is emitted from the emission surface 30b while being scattered in the optical axis direction (Y direction) and the longitudinal direction of the incident surface 30a (X direction).

The illuminating light emitted from the light guide plate 30 illuminates the display panel 10 after the directional angle thereof is reduced in a direction orthogonal to the ridges (Y direction) by the prism sheet 23. The illuminating light is caused to pass through predetermined pixels of the display panel 10, so that an image is displayed on the display panel 10.

According to the present embodiment, each of the prisms 32 that scatter the guided light in the longitudinal direction of the incident surface 30a has the top portion 32a including the curved portion 32c which has a curved shape in cross section, and the bottom portions 32b that extend upward from the flat portions 31 of a surface of the light guide plate 30 have flat surfaces. Therefore, even when there are differences in height H between the prisms 32 depending on the processing accuracy in the process of forming a mold of the light guide plate 30, the inclination angle α of the bottom portions 32b of the prisms 32 with respect to the flat portions 31 can be made uniform. Accordingly, the brightness of the illuminating light emitted from the backlight 20 (illuminating device) can be made more uniform.

Also in the case where the pitch P and the width W of the prisms 32 are equal to each other and the flat portions 31 are not formed, even when there are differences in height H and pitch P between the prisms 32 depending on the processing accuracy in the process of forming a mold of the light guide plate 30, the inclination angle α of the bottom portions 32b of the prisms 32 can be made uniform.

The prisms 32 may instead be formed on a surface of the light guide plate 30 that opposes the emission surface 30b.

Figure 5:
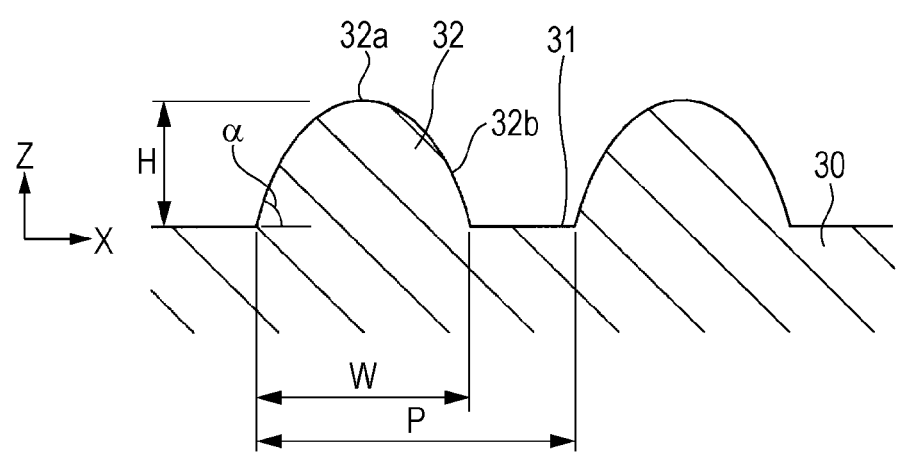
FIG. 5 is a sectional view of a light guide plate of a backlight included in a display device according to a second embodiment of the present invention taken along a plane parallel to an incident surface.

Next, a display device 1 according to a second embodiment will be described. In the present embodiment, a light guide plate 30 includes prisms having a cross sectional shape that differs from that in the first embodiment. Other structures are similar to those of the first embodiment. FIG. 5 is a sectional view of the light guide plate 30 taken along a plane parallel to an incident surface 30a. For convenience of description, components similar to those in the above-described first embodiment illustrated in FIGS. 1 to 4 are denoted by the same reference numerals.

The cross sectional shape of each prism 32 is such that a top portion 32a continues to bottom portions 32b so as to form an elliptical arc having a major axis orthogonal to the flat portions 31 (X direction). Thus, the top portion 32a and the bottom portions 32b of each prism 32 are formed as a curved portion 32c. The radius of curvature of the bottom portions 32b is greater than that of the top portion 32a.

Therefore, even when there are differences in height H between the prisms 32 depending on the processing accuracy in the process of forming a mold of the light guide plate 30, differences in inclination angle α with respect to the flat portions 31 (for example, 70°) between the bottom portions 32b can be reduced.

The aspect ratio of the elliptical arc that defines the cross sectional shape of the prisms 32 is preferably set to 1.25 or more. For example, when the aspect ratio is more than 1.25 in the case where the height H of the prisms 32 is 10 μm and the inclination angle α is 70°, the differences in inclination angle α caused by the differences in height H of ±3 μm can be set to within about ±10°.

In addition, when the aspect ratio of the elliptical arc that defines the cross sectional shape of the prisms 32 is 2.5 or more in the case where the height H of the prisms 32 is 10 μm and the inclination angle α is 70°, the differences in inclination angle α caused by the differences in height H of ±3 μm can be set to within about ±5°.

According to the present embodiment, each of the prisms 32 that scatter the guided light in the longitudinal direction of the incident surface 30a has the top portion 32a including the curved portion 32c which has a curved shape in cross section, and the radius of curvature of the bottom portions 32b that extend upward from the flat portions 31 is greater than that of the top portion 32a. Therefore, even when there are differences in height H between the prisms 32 depending on the processing accuracy in the process of forming a mold of the light guide plate 30, differences in the inclination angle α with respect to the flat portions 31 between the bottom portions 32b of the prisms 32 can be reduced. Accordingly, the brightness of the illuminating light emitted from the backlight 20 (illuminating device) can be made more uniform.

Also in the case where the pitch P and the width W of the prisms 32 are equal to each other and the flat portions 31 are not formed, even when there are differences in height H and pitch P between the prisms 32 depending on the processing accuracy in the process of forming a mold of the light guide plate 30, differences in the inclination angle α between the bottom portions 32b of the prisms 32 can be reduced.

The prisms 32 may instead be formed on a surface of the light guide plate 30 that opposes the emission surface 30b.

Figure 6:
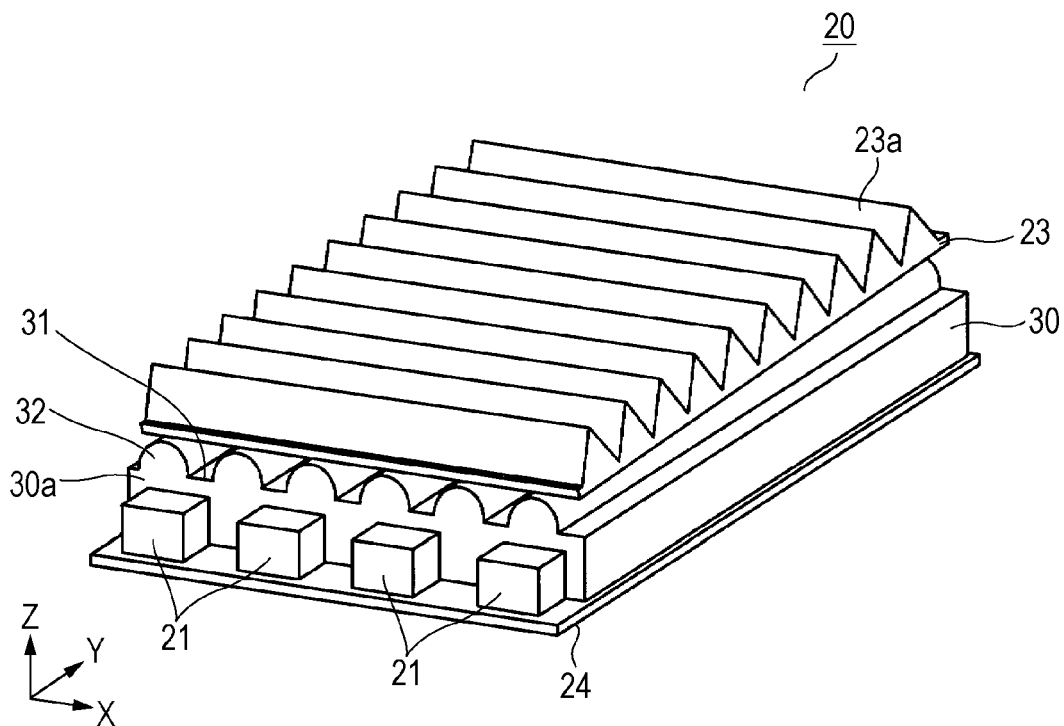
FIG. 6 is a perspective view of a backlight included in a display device according to a third embodiment of the present invention.

FIG. 6 is a perspective view of a backlight 20 of a display device 1 according to a third embodiment. For convenience of description, components similar to those in the above-described first embodiment illustrated in FIGS. 1 to 4 are denoted by the same reference numerals. In the present embodiment, prisms 23a are provided on an upper surface of a prism sheet 23 (surface adjacent to the display panel 10 (see FIG. 1)). Other structures are similar to those of the first embodiment.

The prism sheet 23 is arranged so as to oppose an emission surface 30b of a light guide plate 30 (see FIG. 1), and a plurality of prisms 23a that extend in the X direction are arranged next to each other in the Y direction. The prisms 23a substantially have the shape of an isosceles triangle in cross section, and reduce the directional angle of the light emitted from the emission surface 30b in a direction orthogonal to the ridges (Y direction). Accordingly, the brightness on the front surface of the emission surface 30b can be increased.

The light guide plate 30 includes prisms 32 that are similar to those in the first embodiment. Bottom portions 32b (see FIG. 4) of each prism 32 that extend upward from the flat surfaces 31 are flat surfaces. An upper portion of each prism 32 includes a curved portion 32c (see FIG. 4) that continues from the bottom portions 32b and has an arc shape in cross section. The cross sectional shape of the curved portion 32c is not limited to an arc shape, and may instead be other curved shapes, such as an elliptical arc shape. Thus, a top portion 32a of each prism 32 includes the curved portion 32c having a curved surface. The radius of curvature of the bottom portions 32b is infinite, and is therefore greater than that of the top portion 32a.

According to the present embodiment, similar to the first embodiment, each of the prisms 32 that scatter the guided light in the longitudinal direction of the incident surface 30a has the top portion 32a including the curved portion 32c which has a curved shape in cross section, and the bottom portions 32b that extend upward from the flat portions 31 have flat surfaces. Therefore, even when there are differences in height H between the prisms 32 depending on the processing accuracy in the process of forming a mold of the light guide plate 30, the inclination angle α of the bottom portions 32b of the prisms 32 with respect to the flat portions 31 can be made uniform. Accordingly, the brightness of the illuminating light emitted from the backlight 20 (illuminating device) can be made more uniform.

Also in the case where the pitch P and the width W of the prisms 32 are equal to each other and the flat portions 31 are not formed, even when there are differences in height H and pitch P between the prisms 32 depending on the processing accuracy in the process of forming a mold of the light guide plate 30, the inclination angle α of the bottom portions 32b of the prisms 32 can be made uniform.

In the present embodiment, similar to the second embodiment, the cross sectional shape of each prism 32 of the light guide plate 30 may be such that the top portion 32a continues to the bottom portions 32b so as to form an elliptical arc having a major axis orthogonal to the flat portions 31. In addition, the prisms 32 may instead be formed on a surface of the light guide plate 30 that opposes the emission surface 30b.

Figure 7:
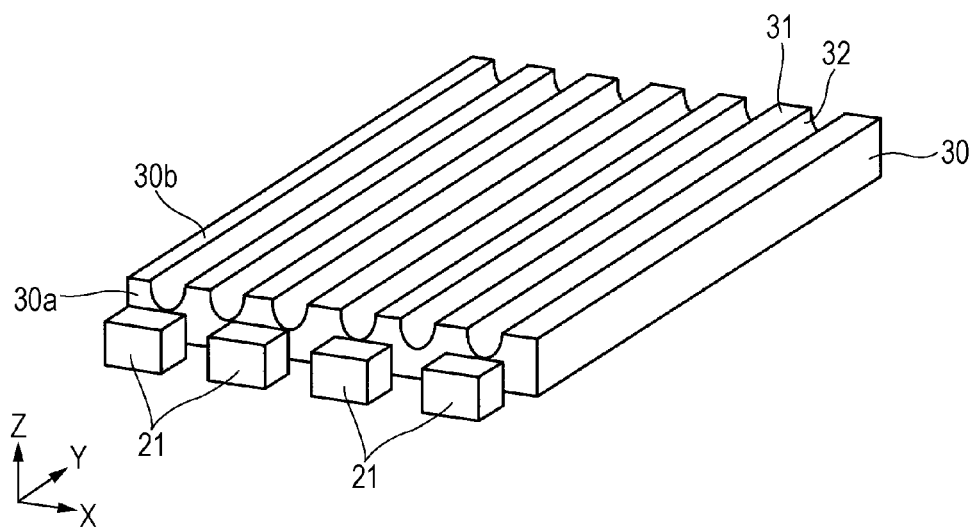
FIG. 7 is a perspective view of a light guide plate of a backlight included in a display device according to a fourth embodiment of the present invention.

FIG. 7 is a perspective view of a light guide plate 30 of a backlight 20 included in a display device 1 according to a fourth embodiment. For convenience of description, components similar to those in the above-described first embodiment illustrated in FIGS. 1 to 4 are denoted by the same reference numerals. In the present embodiment, the shape of prisms 32 of the light guide plate 30 differs from that in the first embodiment. Other structures are similar to those of the first embodiment.

Flat portions 31, which are flat surfaces parallel to the X-Y plane, and prisms 32, which are recessed from the flat portions 31, are alternately arranged in the X-direction on an emission surface 30b of the light guide plate 30. Thus, the prisms 32 extend in the Y direction and are arranged next to each other in the X direction. The flat portions 31 are flat in the X direction.

Figure 8:
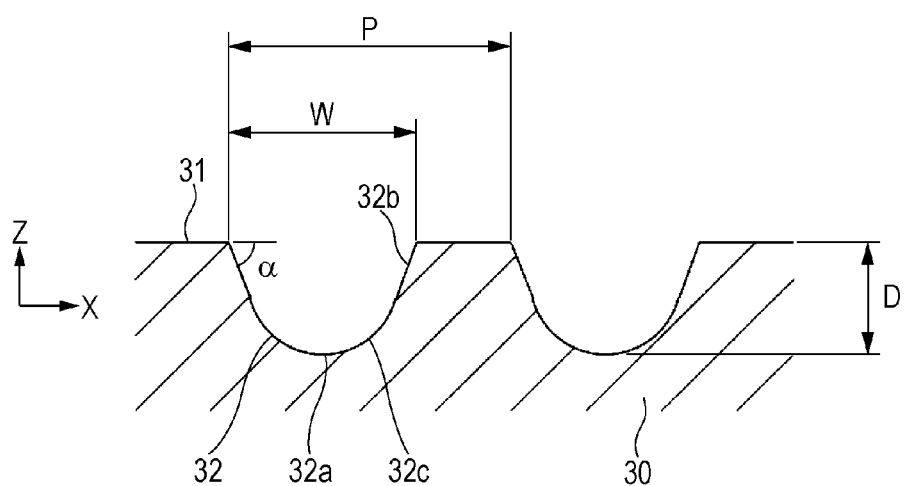
FIG. 8 is a sectional view of prisms included in the light guide plate of the backlight included in the display device according to the fourth embodiment of the present invention.

FIG. 8 is a sectional view of the light guide plate 30 taken along a plane parallel to an incident surface 30a. The prisms 32 are formed such that a depth D thereof from the flat portions 31 in the Z direction and a width W thereof in the X direction are set to predetermined values, and are arranged next to each other in the X direction at a pitch P.

Bottom portions 32b of each prism 32 that extend downward from the flat surfaces 31 are flat surfaces. A lower portion of each prism 32 includes a curved portion 32c that continues from the bottom portions 32b and has an arc shape in cross section. The cross sectional shape of the curved portion 32c is not limited to an arc shape, and may instead be other curved shapes, such as an elliptical arc shape. Thus, a top portion 32a of each prism 32 includes the curved portion 32c having a curved surface. The radius of curvature of the bottom portions 32b is infinite, and is therefore greater than that of the top portion 32a.

Since the light guide plate 30 is a molded part made of a resin, there are differences in depth D between the prisms 32 depending on the processing accuracy in the process of forming a mold. Since the bottom portions 32b of the prisms 32 are flat surfaces, the inclination angle α (for example, 70°) of the bottom portions 32b with respect to the flat portions 31 can be made uniform irrespective of the differences in depth D.

According to the present embodiment, similar to the first embodiment, each of the prisms 32 that scatter the guided light in the longitudinal direction of the incident surface 30a has the top portion 32a including the curved portion 32c which has a curved shape in cross section, and the bottom portions 32b that extend upward from the flat portions 31 have flat surfaces. Therefore, even when there are differences in depth D between the prisms 32 depending on the processing accuracy in the process of forming a mold of the light guide plate 30, the inclination angle α of the bottom portions 32b of the prisms 32 with respect to the flat portions 31 can be made uniform. Accordingly, the brightness of the illuminating light emitted from the backlight 20 (illuminating device) can be made more uniform.

Also in the case where the pitch P and the width W of the prisms 32 are equal to each other and the flat portions 31 are not formed, even when there are differences in depth D and pitch P between the prisms 32 depending on the processing accuracy in the process of forming a mold of the light guide plate 30, the inclination angle α of the bottom portions 32b of the prisms 32 can be made uniform.

In the present embodiment, similar to the second embodiment, the cross sectional shape of each prism 32 formed in a recessed shape in the emission surface 30b of the light guide plate 30 may be such that the top portion 32a continues to the bottom portions 32b so as to form an elliptical arc having a major axis orthogonal to the flat portions 31. In addition, the prisms 32 may instead be formed on a surface of the light guide plate 30 that opposes the emission surface 30b. In addition, similar to the third embodiment, prisms 23a may be formed on an upper surface (surface adjacent to the display panel 10) of a prism sheet 23.

Figure 9:
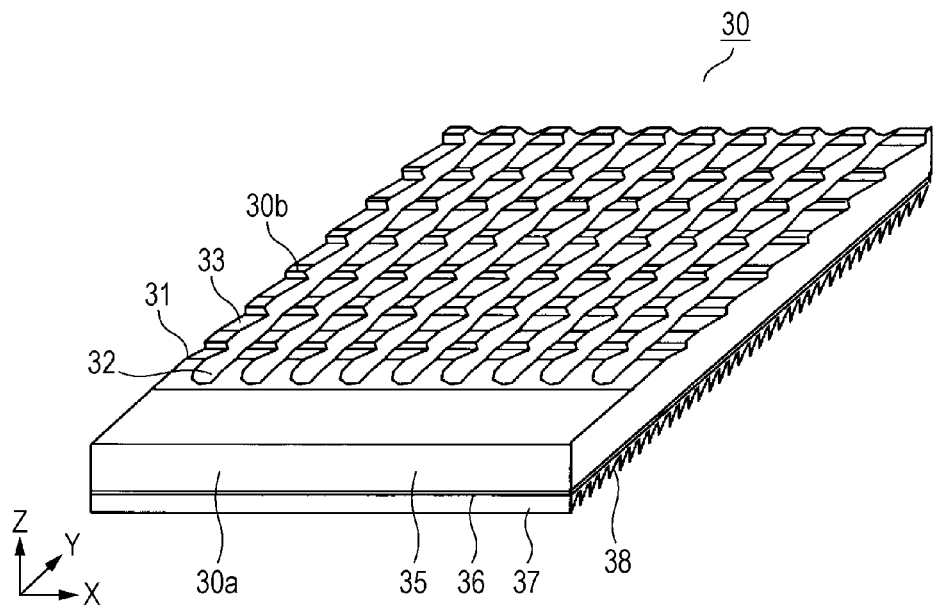
FIG. 9 is a perspective view of a light guide plate of a backlight included in a display device according to a fifth embodiment of the present invention.
Figure 10:
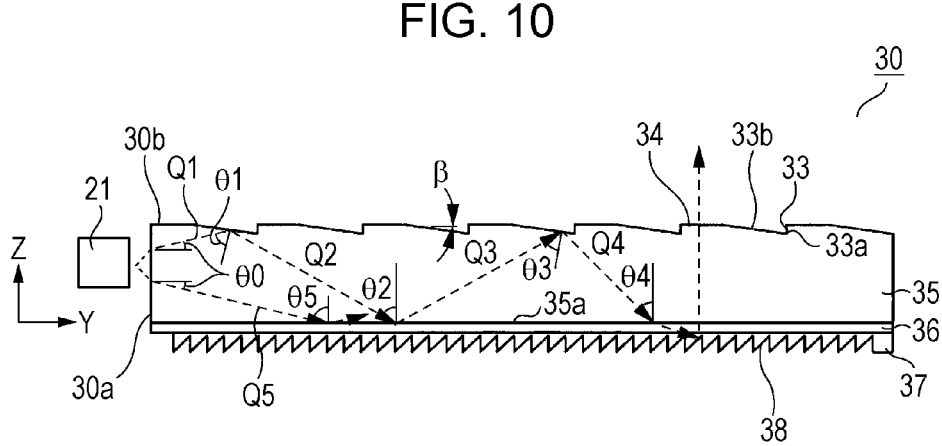
FIG. 10 is a sectional view of the light guide plate of the backlight included in the display device according to the fifth embodiment of the present invention taken along a plane perpendicular to an incident surface.

FIGS. 9 and 10 are a perspective view and a side sectional view, respectively, of a light guide plate 30 of a backlight 20 included in a display device 1 according to a fifth embodiment. For convenience of description, components similar to those in the above-described first embodiment illustrated in FIGS. 1 to 4 are denoted by the same reference numerals. In the present embodiment, the structure of the light guide plate 30 differs from that in the first embodiment, and the prism sheet 23 (see FIG. 1) is omitted. Other structures are similar to those of the first embodiment.

The light guide plate 30 includes a light guide portion 35, a low-refractive-index layer 36, and a light collecting portion 37 that are stacked together in the Z direction. The light guide portion 35 is made of, for example, a transparent resin, such as an acrylic resin or polycarbonate, and includes an incident surface 30a and an emission surface 30b. The light guide portion 35 guides light emitted from light sources 21.

The refractive index n1 of the light guide portion 35 is preferably 1.42 or more, and more preferably, in the range of 1.59 to 1.65. When the light guide portion 35 is made of an acrylic resin, the refractive index n1 can be set to about 1.49. In addition, when the light guide portion 35 is made of polycarbonate, the refractive index n1 can be set to about 1.59. When the light guide portion 35 is made of an acrylic resin, the transmittance can be made higher than that in the case where the light guide portion 35 is made of polycarbonate.

Flat portions 31 and prisms 32 are alternately arranged in the X direction on the emission surface 30b of the light guide portion 35. A plurality of prisms 33 that extend in the X direction are arranged next to each other in the Y direction on each flat portion 31. Horizontal surfaces 34 that are parallel to the X-Y plane are provided between the adjacent prisms 33. The prisms 33 may instead be formed so as to be continuous to each other by omitting the horizontal surfaces 34. The horizontal surfaces 34 and the prisms 33 of the flat portions 31 are flat in the X direction.

Each prism 33 includes a vertical surface 33a that is perpendicular to the X-Y plane and an inclined surface 33b (first inclined surface) that is inclined in the Y-Z plane. The inclined surfaces 33b are inclined toward the incident surface 30a, and have a predetermined inclination angle β with respect to a direction orthogonal to the incident surface 30a (Y direction). The inclination angle β is preferably 5° or less, and more preferably, in the range of 0.1° to 3°. The length of the inclined surfaces 33b in the Y direction is preferably 0.25 mm or less, and more preferably, in the range of 0.01 mm to 0.10 mm.

Figure 11:
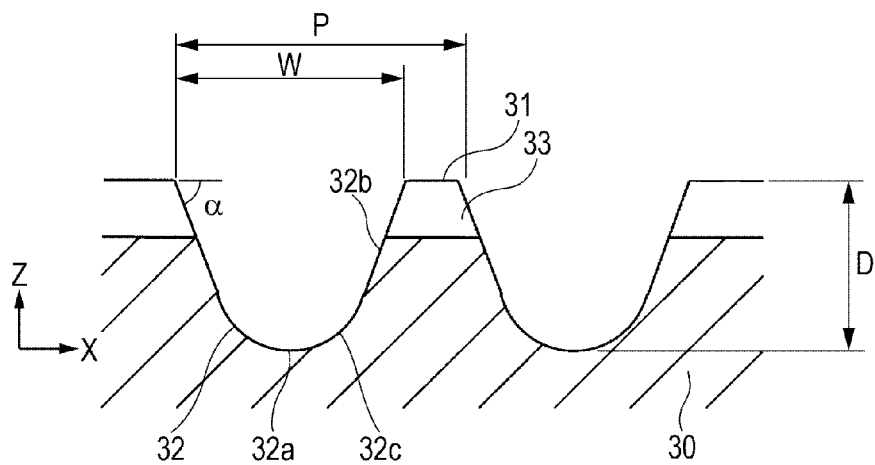
FIG. 11 is a sectional view of the light guide plate of the backlight included in the display device according to the fifth embodiment of the present invention taken along a plane parallel to the incident surface.

Similar to the fourth embodiment, the prisms 32 are recessed from the flat portions 31. FIG. 11 is a sectional view of the light guide plate 30 taken along a plane parallel to the incident surface 30a. The prisms 32 are formed such that a depth D thereof from the flat portions 31 in the Z direction and a width W thereof in the X direction are set to predetermined values, and are arranged in the X direction at a pitch P.

Bottom portions 32b of each prism 32 that extend downward from the flat surfaces 31 are flat surfaces. A lower portion of each prism 32 includes a curved portion 32c that continues from the bottom portions 32b and has an arc shape in cross section. The cross sectional shape of the curved portion 32c is not limited to an arc shape, and may instead be other curved shapes, such as an elliptical arc shape. Thus, a top portion 32a of each prism 32 includes the curved portion 32c having a curved surface. The radius of curvature of the bottom portions 32b is infinite, and is therefore greater than that of the top portion 32a.

Referring to FIGS. 9 and 10, the low-refractive-index layer 36 is adjacent to a rear surface 35a of the light guide portion 35, and has a refractive index lower than that of the light guide portion 35. The low-refractive-index layer 36 is made of, for example, a fluorinated acrylate or a resin containing hollow particles, such as nano-sized inorganic filler. The refractive index n2 of the low-refractive-index layer 36 is preferably 1.42 or less, and more preferably, in the range of 1.10 to 1.35. The refractive index n1 of the light guide portion 35 and the refractive index n2 of the low-refractive-index layer 36 preferably satisfy n1/n2>1.18.

When the low-refractive-index layer 36 is made of a fluorinated acrylate, the refractive index n2 can be set to about 1.35. When the low-refractive-index layer 36 is made of a resin containing hollow particles, the refractive index n2 can be set to 1.30 or less.

The light collecting portion 37 is adjacent to the low-refractive-index layer 36, and has a refractive index greater than or equal to that of the low-refractive-index layer 36. Therefore, the light collecting portion 37 and the low-refractive-index layer 36 may be made of the same material.

Figure 12:
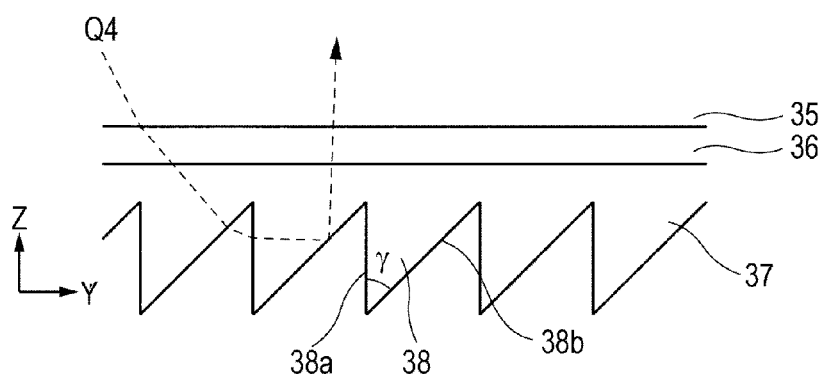
FIG. 12 is a sectional view of a light collecting portion of the light guide plate of the backlight included in the display device according to the fifth embodiment of the present invention taken along a plane perpendicular to the incident surface.

A plurality of prisms 38 that extend in the X direction are arranged next to each other in the Y direction on a rear surface of the light collecting portion 37. As illustrated in FIG. 12, each prism 38 includes a vertical surface 38a that is perpendicular to the X-Y plane and an inclined surface 38b (second inclined surface) that is inclined in the Y-Z plane. The inclined surfaces 38b are inclined toward the incident surface 30a, and have a predetermined inclination angle γ with respect to the Z direction.

The length of the inclined surfaces 38b in the Y direction is about 0.1 mm or less, and more preferably, in the range of about 0.01 mm to about 0.025 mm. The inclination angle γ is the vertical angle of the prisms 38, and is preferably in the range of 40° to 50°. The vertical surfaces 38a may be inclined with respect to the Y direction. In this case, the prisms 38 are preferably formed such that the vertical angle thereof is in the range of 40° to 50°.

In the display device 1 having the above-described structure, light emitted from the light sources 21 has the highest intensity in the forward direction of the light sources 21 (Y direction), and spreads in the range of about ±90° in the X and Z directions with respect to the forward direction (Y direction). The light emitted from the light sources 21 is refracted when the light is incident on the incident surface 30a of the light guide portion 35. When the refraction angle of this light is θ0 and the critical angle between the light guide portion 35 and air is φ1, θ0<φ1 is satisfied. Here, φ1 is equal to arcsin(1/n1), and is 39° when, for example, n1=1.59. Namely, the spreading angle of the light incident on the incident surface 30a in the X and Z directions with respect to the Y direction is ±φ1.

Light that has entered the light guide portion 35 through the incident surface 30a is guided by being reflected between the emission surface 30b and the rear surface 35a. Light that travels toward the emission surface 30b from the incident surface 30a is incident on the horizontal surfaces 34 or the inclined surfaces 33b. The incident angle of light incident on the horizontal surfaces 34 is 90°−φ1 or more. The incident angle of light Q1 incident on the inclined surfaces 33b is 90°−φ1−β or more.

At this time, light incident on the emission surface 30b at an incident angle smaller than the critical angle φ1 is emitted from the emission surface 30b, and light incident on the emission surface 30b at an incident angle greater than the critical angle φ1 is totally reflected. Light Q2 reflected by the inclined surfaces 33b is incident on the rear surface 35a at an incident angle θ2. The incident angle θ2 is 90°−φ1−2·β or more. At this time, light incident on the rear surface 35a at an incident angle smaller than the critical angle φ2 between the light guide portion 35 and the low-refractive-index layer 36 enters the low-refractive-index layer 36. Light incident on the rear surface 35a at an incident angle greater than the critical angle φ2 is totally reflected. The critical angle φ2 is equal to arcsin(n2/n1), and is 58° when, for example, n1=1.59 and n2=1.35.

Light Q3 reflected by the rear surface 35a is incident on the emission surface 30b. At this time, the incident angle of light incident on the horizontal surfaces 34 is θ2, and the incident angle θ3 of light incident on the inclined surfaces 33b is 90°−3·β or more. Similar to the above-described case, light incident on the emission surface 30b at an incident angle smaller than the critical angle θ1 is emitted from the emission surface 30b, and light incident on the emission surface 30b at an incident angle greater than the critical angle θ1 is totally reflected.

Light Q4 reflected by the inclined surfaces 33b is incident on the rear surface 35a at an incident angle θ4. The incident angle θ4 is 90°−φ1−4·β or more. Light incident on the rear surface 35a at an incident angle smaller than the critical angle φ2 enters the low-refractive-index layer 36, and light incident on the rear surface 35a at an incident angle greater than the critical angle φ2 is totally reflected.

Thus, incident angles at which light guided by the light guide portion 35 is incident on the emission surface 30b and the rear surface 35a gradually decrease owing to the reflection by the inclined surfaces 33b. The incident angle of light on the interface between the light guide portion 35 and the low-refractive-index layer 36 decreases stepwise by 2·β at a time, and the light enters the low-refractive-index layer 36 when the incident angle becomes smaller than the critical angle φ2. Therefore, the incident angle of the light that enters the low-refractive-index layer 36 from the light guide portion 35 is in the range of φ2 to φ2−2·β.

The light that has entered the low-refractive-index layer 36 passes through the low-refractive-index layer 36 and is incident on the light collecting portion 37. Since the refractive index n3 of the light collecting portion 37 is greater than or equal to the refractive index n2 of the low-refractive-index layer 36, total reflection does not occur at the interface between the low-refractive-index layer 36 and the light collecting portion 37.

As illustrated in FIG. 12, light that has entered the light collecting portion 37 is incident on the inclined surfaces 38b of the prisms 38. Light incident on the inclined surfaces 38b at an incident angle greater than a critical angle φ3 between the light collecting portion 37 and air is totally reflected toward the emission surface 30b. The critical angle φ3 is equal to arcsin(1/n3). When, for example, n1=n3=1.59, φ3=39°. When n1=1.59 and n2=n3=1.35, φ3=48°.

Light incident on the inclined surfaces 38b at an incident angle smaller than the critical angle φ3 is refracted and emitted from the light collecting portion 37. The emitted light is refracted by the vertical surfaces 38a and reenters the light collecting portion 37. When the light repeatedly exits and reenters the light collecting portion 37 in this manner, the light is refracted such that the incident angle thereof gradually increases. As a result, the light is totally reflected by the inclined surfaces 38b.

The light reflected by the inclined surfaces 38b is emitted from the emission surface 30b. Thus, the directional angle of the light emitted from the emission surface 30b can be reduced in a direction orthogonal to the ridges of the prisms 33 and 38 (Y direction). Therefore, the prism sheet 23 according to the first and third embodiments (see FIGS. 1 and 6) can be omitted.

Referring to FIG. 10, light Q5 that travels toward the rear surface 35a of the light guide portion 35 from the incident surface 30a is also repeatedly reflected between the emission surface 30b and the rear surface 35a and enters the low-refractive-index layer 36. Then, the light is reflected by the inclined surfaces 38b of the prisms 38 and emitted from the emission surface 30b.

According to the present embodiment, similar to the first embodiment, each of the prisms 32 that scatter the guided light in the longitudinal direction of the incident surface 30a has the top portion 32a including the curved portion 32c which has a curved shape in cross section, and the bottom portions 32b that extend upward from the flat portions 31 have flat surfaces. Therefore, even when there are differences in depth D between the prisms 32 depending on the processing accuracy in the process of forming a mold of the light guide plate 30, the inclination angle α of the bottom portions 32b of the prisms 32 with respect to the flat portions 31 can be made uniform. Accordingly, the brightness of the illuminating light emitted from the backlight 20 (illuminating device) can be made more uniform.

In addition, since the prisms 32 are formed in the emission surface 30b and inclination surfaces 33b (first inclined surfaces) that oppose the incident surface 30a in an inclined manner are provided between the prisms 32, the incident angle of light that is guided by the light guide plate 30 and incident on the emission surface 30b can be gradually reduced and the guided light can be scattered by the prisms 32.

In addition, since the light guide plate 30 includes the light guide portion 35, the low-refractive-index layer 36, and the light collecting portion 37 and the inclined surfaces 38b (second inclined surfaces) are provided on a surface that is opposite the emission surface 30b across the low-refractive-index layer 36, the directional angle of the light emitted from the emission surface 30b can be reduced. Therefore, the prism sheet 23 (see FIG. 1) can be omitted and the cost of the backlight 20 and the display device 1 can be reduced.

In the present embodiment, similar to the second embodiment, the cross sectional shape of each prism 32 formed in a recessed shape in the emission surface 30b of the light guide plate 30 may be such that the top portion 32a continues to the bottom portions 32b so as to form an elliptical arc having a major axis orthogonal to the flat portions 31. Similar to the first and second embodiments, the prisms 32 may be formed so as to project from the emission surface 30b.

The prisms 33 may instead be formed on the interface between the light guide portion 35 and the low-refractive-index layer 36. In this case, the flat portions 31 may be omitted by setting the pitch P and the width W of the prisms 32 so as to be equal to each other. Also in this case, even when there are differences in height H and pitch P between the prisms 32 depending on the processing accuracy in the process of forming a mold of the light guide plate 30, the inclination angle α of the bottom portions 32b of the prisms 32 can be made uniform.

In the first to fifth embodiments, the backlight 20 can be used as illuminating equipment to be used indoors and outdoors.

INDUSTRIAL APPLICABILITY

The present invention may be applied to an illuminating device, such as a backlight or illuminating equipment, including a light guide plate and a display device, such as a liquid-crystal display device, including the illuminating device.

REFERENCE SIGNS LIST 1 display device
10 display panel
11 active matrix substrate
12 counter substrate
13 polarizing film
20 backlight (illuminating device)
21 light source
23 prism sheet
24 reflective sheet
30 light guide plate
30a incident surface
30b emission surface
31 flat portion
32 prism
32a top portion
32b bottom portion
33, 38 prism
33a, 38a vertical surface
33b, 38b inclined surface
34 horizontal surface
35 light guide portion
36 low-refractive-index layer
37 light collecting portion

The invention claimed is:

1. An illuminating device comprising:
a plurality of light sources arranged next to each other in one direction and a light guide plate having an incident surface that opposes the light sources on a side surface thereof, the light guide plate guiding light incident on the incident surface and emitting illuminating light from an emission surface provided on a front surface thereof, wherein
the light guide plate includes a plurality of prisms that extend in an optical axis direction of the light sources and are arranged next to each other in a longitudinal direction of the incident surface, the prisms scattering the guided light in the longitudinal direction,
at least a top portion of each prism includes a curved portion having a curved shape in cross section,
a bottom portion of each prism, the bottom portion extending upward from a surface of the light guide plate, has a radius of curvature greater than that of the top portion,
each prism has the shape of an elliptical arc having a major axis orthogonal to the longitudinal direction in cross section, and wherein the elliptical arc has an aspect ratio of 1.25 or more,
the prisms are formed on the emission surface, and first inclined surfaces that oppose the incident surface in an inclined manner and that are arranged next to each other in the optical axis direction are provided between the prisms, and
the light guide plate includes a light guide portion having the incident surface and the emission surface, a low-refractive-index layer that is adjacent to a rear surface of the light guide portion and has a refractive index lower than that of the light guide portion, and a light collecting portion including second inclined surfaces that are arranged next to each other in the optical axis direction, the second inclined surfaces being formed on a surface of the light collecting portion that is opposite the emission surface across the low-refractive-index layer and opposing the incident surface in an inclined manner.

2. A display device comprising the illuminating device according to claim 1 and a display panel arranged so as to oppose the emission surface of the light guide plate.

3. A display device comprising the illuminating device according to claim 1 and a display panel arranged so as to oppose the emission surface of the light guide plate.

4. A display device comprising the illuminating device according to claim 1 and a display panel arranged so as to oppose the emission surface of the light guide plate.

* * * * *